United States Patent [19]

Hartz

[11] 3,859,925
[45] Jan. 14, 1975

[54] TRANSPORTATION SYSTEM

[76] Inventor: Billy J. Hartz, 4016 N.E. 110th, Seattle, Wash. 98125

[22] Filed: Oct. 15, 1973

[21] Appl. No.: 406,533

Related U.S. Application Data

[63] Continuation-in-part of Ser. No. 77,060, Oct. 1, 1970, abandoned, and Ser. No. 344,092, March 23, 1973, Pat. No. 3,791,308.

[52] U.S. Cl.................... 104/88, 104/139, 104/140, 187/1 R, 187/17
[51] Int. Cl.............................................. B61d 5/00
[58] Field of Search ......... 104/139, 23 FS, 148 LM, 104/134; 105/141, 144; 187/1 R, 27, 17

[56] References Cited
UNITED STATES PATENTS

| | | | |
|---|---|---|---|
| 3,368,496 | 2/1968 | Falk et al. | 104/138 R |
| 3,373,697 | 3/1968 | Hartje | 104/23 FS |
| 3,381,627 | 5/1968 | Hart et al. | 104/23 FS |
| 3,483,829 | 12/1969 | Baary | 104/88 |
| 3,526,193 | 9/1970 | Parshall | 104/88 |

*Primary Examiner*—M. Henson Wood, Jr.
*Assistant Examiner*—Richard A. Bertsch
*Attorney, Agent, or Firm*—Christensen, O'Connor, Garrison & Havelka

[57] ABSTRACT

A mass transit system compatible with existing right-of-way usages is described. A self-propelled carriage mechanism supports a passenger or cargo-carrying compartment in both the vertical and the horizontal planes by means of a vertical strut. The compartment is positioned substantially above the running gear on a strut supported by the running gear. The running gear travels within an entrenched passageway having a narrow slit at the top for passage of the strut connecting the compartment and the running gear. The top surface of this passageway is suitable for use by surface traffic right-of-way. A flexible closure member may be utilized to close the slit prior to and subsequent to passage of the mass transit vehicle. The compartment is positioned far enough above the running gear so as to clear surface traffic and to avoid collision between the compartment and other vehicles occupying the right-of-way. The entrenched passageway in which the running gear operates may be positioned in the center of a roadway between the lanes of traffic, at the edge thereof or in other right-of-way locations, as desired. Switching mechanisms are provided so that the system may be used in feeder and trunk line-type applications as well as loop-type and car reversal methods of use. The transit system is especially adapted to carry detachable containers between service locations. The containers are removably connected to lift mechanisms on one or more struts which can raise the containers from ground level to a given distance above the ground for transporting to another service location.

8 Claims, 15 Drawing Figures

PATENTED JAN 14 1975

PATENTED JAN 14 1975

TRANSPORTATION SYSTEM

This application is a continuation-in-part of Ser. No. 77,060, filed on Oct. 1, 1970, now abandoned but expressly incorporated herein by reference, and Ser. No. 344,092, filed Mar. 23, 1973, now U.S. Pat. No. 3,791,308, also expressly incorporated herein by reference.

FIELD OF INVENTION

This invention relates to a mass transit system and, more particularly, to an urban mass transit system for transporting individuals and goods from one location to another in an urban area, and which is adaptable for use with existing right-of-way usages,

PRIOR ART

It is known in the prior art to position the running gear of cable trolley cars beneath the surface of the pavement and have the trolley car passenger compartment positioned immediately above the pavement and connected to the running gear with a vertical member running down from the passenger compartment to the running gear. Similarly, it is known to use monorail type of vehicles in which the passenger compartment sits directly upon an elevated rail member to minimize interference with surface traffic and travels on the rail member by use of steel or rubber tire-type running gear. It is also known to use trolley car systems either self-propelled or cable towed having steel tracks embedded in the surface of the roadway upon which steel wheels or rubber tired wheels may run to carry the trolley on its way. An example of such a system would be the well known cable car system in San Francisco. Each of these systems has the obvious disadvantage that interferes with the other uses of the roadbed right-of-way and frequently is limited in usefulness due to the problems presented by the elements, such as rainfall and snow. In addition, supplying power to such transit systems in the event that they use electrical power requires the use of overhead lines or conductors embedded in the surface of the roadbed, either system being subject to criticism from an aesthetic or safety point of view. Furthermore, such systems take up a significant right-of-way and are thus not compatible with existing freeway systems and rapidly increasing urban street usage. The cost of preparing right-of-way roadbeds, major underground excavations, tunnels, and access facilities for train-type systems or subway systems makes their use limited to trunk-line type of operation. Noise, aesthetics and excessive cost associated with the permanent supporting structure likewise exclude monorail systems from installation in the residential areas where mass transit systems should originate.

Other types of transit systems currently in use which utilize internal combustion engines for motive power do not suffer from the problems of high installation expenses for right-of-way and roadbed. However, this type of transit system presents even greater problems of expensive operation and severe air pollution as well as unacceptably high noise levels and street congestion in urban areas. While some of these problems may be overcome by advances in the technology of internal combustion engines, it is necessary to have a completely new concept in mass transit to meet the competing problems of air pollution, increasing urban street congestion and increasing expense of right-of-way installation and operation, yet adequately serve the outlying residential areas as well as the urban and suburban types of neighborhoods. Such a system must be compatible with the existing usages of the street rights-of-way and not require new right-of-way. The system would also be acceptable to city dwellers and suburbanties alike from an aesthetic point of view. It must be sufficiently inexpensive to permit installation throughout suburban communities, yet have versatility to handle high density passenger loads in congested urban areas. The system must not be limited by automobile traffic flow patterns, yet must fit in and be compatible with the present day usages and projected usages of the existing right-of-way.

It is therefore an object of this invention to provide a transportation system capable of handling a variety of cargo loads at increased speed which utilizes, but yet is fully compatible with, existing right-of-way usages in urban and suburban areas.

A further object of this invention is to provide a transportation system which requires no new right-of-way but uses the presently existing urban and suburban street rights-of-way without significantly adding to the congestion thereon.

An additional object of this invention is to provide a transportation system which is substantially pollution free, and which is aesthetically pleasing.

It is a still further object of this invention to provide a transportation system having no overhead wires, exposed tracks or other safety hazards presently known to the prior art transit systems and which is unhampered by rain, ice, snow or bad weather.

One specific object of the present invention is to provide a transportation system which can handle cargo containers of conventional configuration and still fulfill the foregoing broad objects. Particularly, an object of the invention is to provide a self-contained transit vehicle which can pick up and deposit cargo containers at docking locations and which can carry such containers between docking locations without significantly interfering with the existing right-of-ways, thereby significantly decreasing congestion and routing problems presented by present day modes of transportation.

A further specific object of this invention is to provide a transportation system which can be operated in a car reversal mode, in a looped track mode or which may be switched from track to track by use of a novel switching apparatus.

One additional specific object is to provide a mass transit system in which cargo containers of various sizes may be utilized.

A still further object of this invention is to provide a transportation system which may be adapted to use steel or rubber wheel type running gear or air suspension with conventional electric linear induction or other types of energy sources to provide the power necessary to drive the mass transit vehicle.

3,859,925

3

SUMMARY OF THE INVENTION

The transportation system provided by this invention includes a vehicle having a running gear positioned in an entrenched passageway below grade in an existing street right-of-way or in other locations, which is connected to a cargo-carrying compartment positioned above the running gear on one or more structural struts so that the compartment is positioned substantially above the street level during transit, permitting the normal street traffic to pass beneath. The enclosure of the running gear and the separation between the running gear and the compartment provides a substantially noise-free, pollution free, clean and efficient transportation system with essentially no right-of-way requirements beyond those already in use, with no new permanent impediments to existing conventional vehicular traffic.

The cargo-carrying compartments may be conventional containers used for garbage disposal, containerized transportation of goods and other similar load carrying platforms, either open or enclosed, presently used for the transportation of all types of goods. The structural struts include means for lowering and raising the containers between ground level and a height which will allow the containers to clear conventional vehicular traffic using an existing right-of-way. One means for lowering and raising a container is a winch system located on top of the strut which operates in conjunction with a latch mechanism for detachably grasping a container and lifting it from the ground. Another means for lowering and raising a container is provided through a hydraulically actuated, telescoping strut.

The transportation system can be completely automated through the use of computer controlled routing of the vehicles within the system with manual assistance in loading or unloading. If desired the transportation vehicles can be manually controlled from an operator's cab cantilevered from the top portion of the strut so as not to interfere with lowering and raising of the containers.

The running gear may be one of any of the well-known apparatus presently used for such purposes or may be of the "ground-effect" type. For example, steel wheels on tracks may be used or rubber tires running upon concrete or other running surface may be advantageously employed. The ground-effect or "air-pad" type of support system, utilizing a support pad through which compressed air is forced so as to raise the running gear from the support surface may also be used to support the weight of the vehicle and to permit it to move along its intended path.

Should it be desired to install a transit system in which switching is necessary, the conventional switching mechanisms presently used for steel wheel on track type of running gear may be utilized for the undercarriages having steel wheels and tracks for support mechanisms. For the rubber tire upon concrete type of support system, a novel vertical stabilizing apparatus disclosed herein may be employed which travels along one of two or more paths to constrain the vehicle upon its intended path. Similarly, for the ground effect type of support system, a pair of air pad-type lateral stabilizing units may be used, each to run upon one of two selected independent paths to constrain the vehicle along its intended path.

4

BRIEF DESCRIPTION OF THE DRAWINGS

These and other objects, advantages and attributes of this invention may be more readily observed and understood by reference to the several preferred embodiments shown in the attached drawings and described in detail below. Reference is now made to the drawings wherein.

Figures 1, 2, 3, 4:
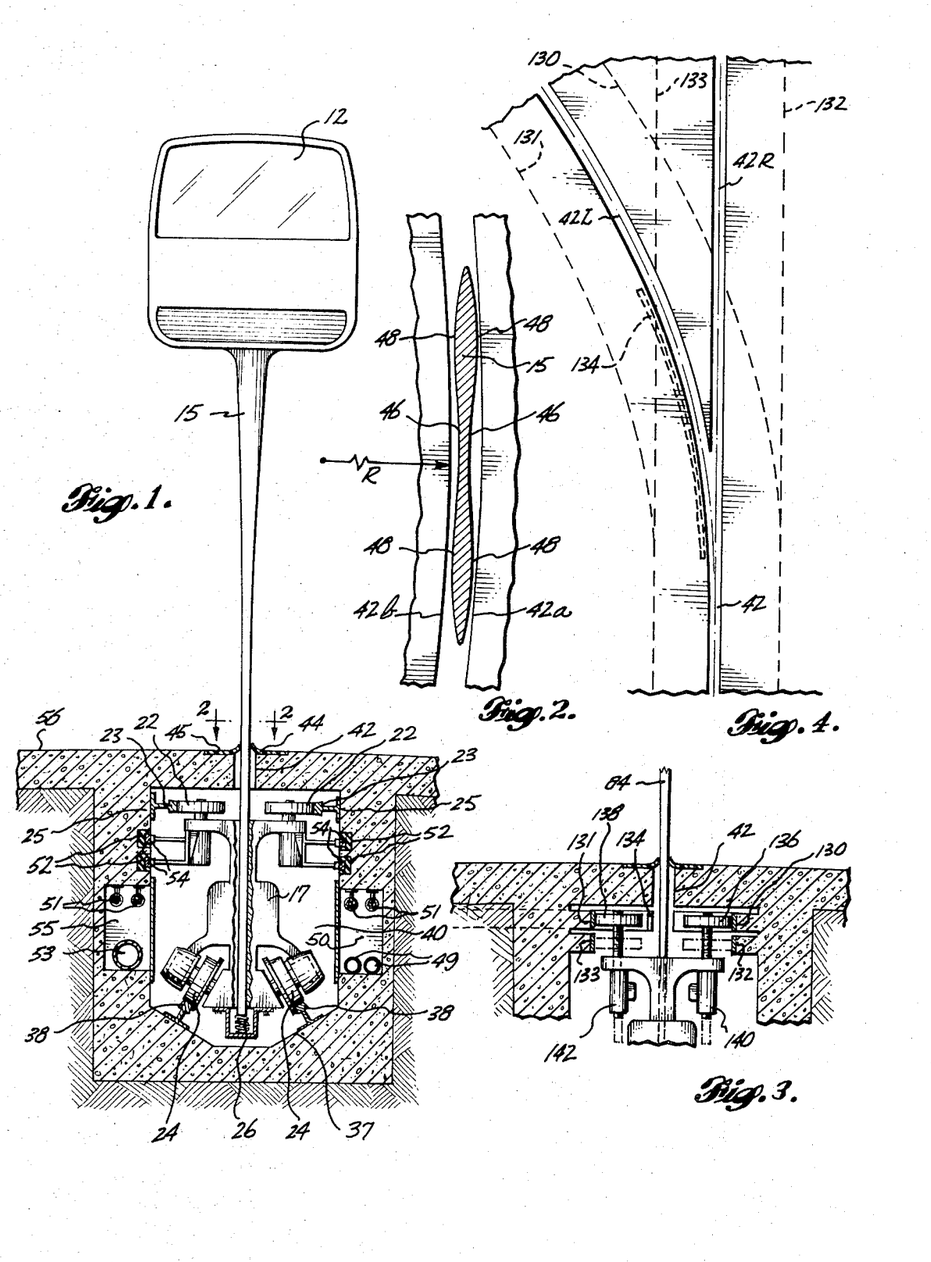
FIG. 1 is a front elevational view of one embodiment of the apparatus of this invention.
FIG. 2 is a cross sectional view of the vertical strut used in the apparatus shown in FIG. 1, taken along line 2—2.
FIG. 3 is a front elevational view, of one type of switching mechanism in this invention.
FIG. 4 is a schematic representation of one type of switching means utilized in this invention.
Figure 5:
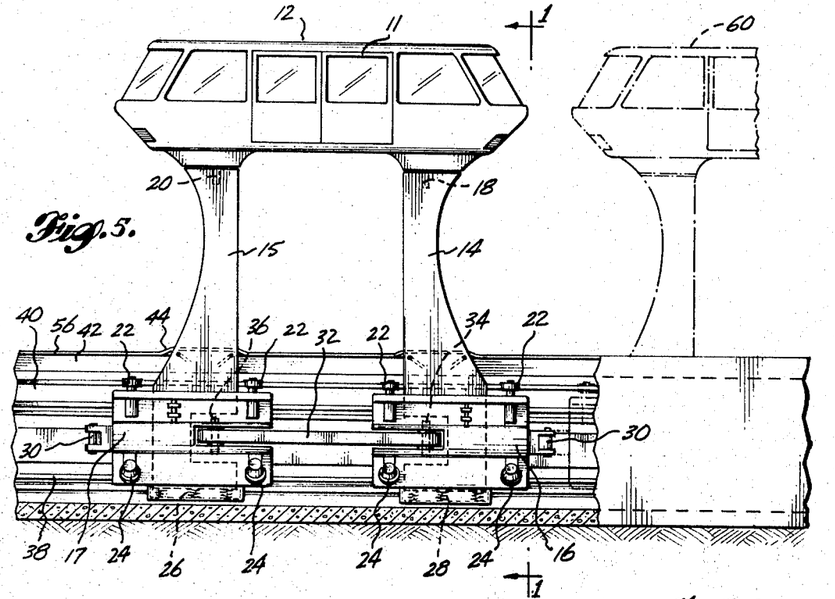
FIG. 5 shows a side elevational view of one embodiment of this invention utilizing a pair of vertical support struts.

Referring more particularly to the drawings, wherein like numerals indicate like parts, there is seen in FIGS. 1 and 5 one embodiment of the mass transit system disclosed in this invention. A passenger compartment 12 having doors 11 is shown supported by a pair of struts 14 and 15 which are in turn carried by the running gears 16 and 17 respectively. Strut 14 is provided with a pivot means 18 directly beneath the passenger compartment 12 and strut 15 is provided with a similar pivot 20 also positioned directly beneath the passenger compartment. Running gears 16 and 17 are connected together by draft link 32 at pivot points 34 and 36 respectively. This draft linkage permits articulation between the two running gears 16 and 17, permitting the flexibility necessary to navigate corners. The struts 14 and 15 may be firmly connected to running gears 16 and 17 or may be carried by a spring damped connection 26 and 28 as shown in FIGS. 1 and 5. The running gears 16 and 17 are carried by a plurality of wheels 24 which, in turn, engage rails 38. The wheels 24 shown in FIGS. 1 and 5 comprise steel wheels adapted to run upon steel tracks 38. However, rubber tires may, of course, be substituted and, in that event, the rails 38 would not be present permitting the rubber tires to run directly upon the tunnel floor 37.

To maintain the necessary vertical stability a plurality of lateral stabilizing wheels 22 are provided for each running gear which engage vertical stabilizer tracks 23. These may be steel wheels on steel tracks, however, rubber tires running upon tracks 23 or directly upon the walls 25 of the entrenched compartment 40 will provide a lesser amount of noise and vibration. A coupling 30 may be provided at each end of the transit car so as to permit connection of additional cars thereto to run the transit cars in a train. The ghost outline of a second car 60 is shown in FIG. 5 to demonstrate this mode of operation.

Referring particularly to FIG. 1 showing a front view of the transit vehicle, passenger compartment 12 is shown positioned substantially above the upper surface of the pavement 56 and is carried by strut 15. Strut 15 extends downwardly to the running gear 17 through slot 42 in the pavement 56. A rubber or other elastomeric material may be utilized as slot cover 44 to prevent entrance of dirt, rain, water and snow and other foreign materials into tunnel 40 but yet permit the car to travel along with the struts opening the slot cover 44 much like a zipper. Strut 15 may be equipped with air jets to open slot cover without causing damage thereto by friction of the strut surface upon the slot cover. The running gear 17 and the surface upon which it travels are all located inside compartment 40, which is positioned beneath the right-of-way surface 56 thus freeing the surface 56 for its normally intended uses for conventional vehicles and pedestrians while providing a versatile mass transit system. Entrenched compartment 40 may also contain utilities such as telephone and electrical wires 51, water supply 49, sewer pipe 53 and the like positioned inside utilities chamber 50 and 55 or at other appropriate locations within the compartment 40.

The power supply needed to operate the transit system may be provided by the use of the required number of electrical contact brushes 54 traveling along the power supply conductors 52. This power supply may be utilized to drive the support and drive wheels 24 and may be used to supply power to utilities necessary for passenger comfort and for operation of the transit vehicle. Communication and control may likewise be furnished through this power supply.

Figure 6:
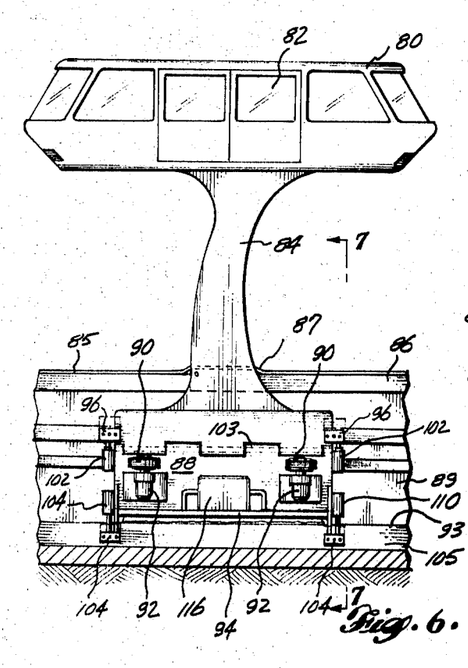
FIG. 6 shows a second embodiment of this invention utilizing a single support strut and having a ground effect support mechanism.

Referring particularly to FIG. 6, there is shown a single strut embodiment of this invention wherein a passenger compartment 80, having door 82, is positioned substantially above the right-of-way level 85 on strut 84 to permit operation of the rapid transit system without substantial interference with existing usages of the right-of-way. A running gear and undercarriage 88 is connected to the passenger compartment 80 by vertical strut 85 extending upwardly through slot 86.

Figure 7:
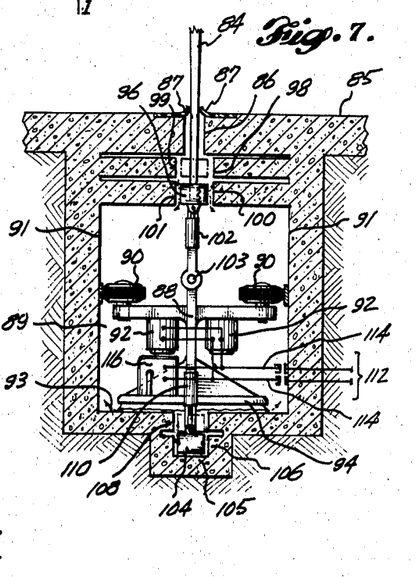
FIG. 7 is a cross sectional view of the running gear portion of the embodiment of this invention shown in FIG. 6, taken along line 7—7 thereof.

With reference to FIGS. 6 and 7, the running gear 88 of "ground effect" embodiment of the invention shown comprises a horizontally oriented plate 94 positioned directly above the bottom 93 of tunnel 89. Compressed air from the compressor 116 is forced downwardly through a plurality of air nozzles (not shown) in plate 94 in a sufficient volume and pressure to cause the transit vehicle to be lifted slightly, permitting it to travel along its intended path. Drive wheels 90, which are preferably tensioned outwardly against the compartment walls 91 by use of springs, air cylinders, or the like are used to impart motion to the transit car. Drive motors 92 supply the required rotational motion to the drive wheels 90.

The lower portion of the running gear 88 extends downwardly into a recess 105 which defines a pair of bearing surfaces 106 and 108 along each side thereof. An air cushion stabilizer 104 extends downwardly into the recess 105 and is positioned next to one or the other of the bearing surfaces 106 and 108. An air bearing is maintained between the air cushion stabilizer 104 and the walls of recess 105 by use of air jets directed outwardly from the air cushion stabilizer 104. Bearing surfaces 106 and 108 define separate tracks for switching purposes and, depending upon which track is desired, the air cushion stabilizer 104 is positioned by switching cylinder 110 so that air from the air cushion stabilizer 104 impinges upon the walls of bearing surface 106 or 108 and constrains the running gear to travel along the path so chosen.

A vertical stabilizer air pad and switching apparatus is positioned at the upper portion of compartment 89. An upper pair of bearing surfaces 98 and 99 and a lower pair of bearing surfaces 100 and 101 define separate tracks for switching purposes and a lateral stabilizer air pad 96 is positioned therein. Air pad 96 is constructed and arranged to impinge air upon one or the other of the pairs of bearing surfaces. The position of the vertical stabilizer air pad 96 may be changed from a first position as shown in FIG. 7, wherein the air from the vertical stabilizer air pad impinges upon bearing surfaces 100 and 101 to a second position (shown in outline) wherein the vertical stabilizer air pad impinges air upon bearing surfaces 98 and 99. Movement of the vertical stabilizer air pad 96 from one position to the other may be effected by use of a switching cylinder 102 thus causing the vehicle to follow the path defined by the bearing surfaces upon which the air from air pad 96 impinges.

Electrical power is provided to the running gear and utilities of the transit car shown in FIGS. 6 and 7 through use of conductors 112 which are engaged by brushes 114. The schematic arrangement shown may then be used to distribute the power to various pieces of equipment in the running gear and passenger compartment or any other suitable distribution system well known in the art may be utilized.

A pivot 103 is shown positioned in the running gear approximately mid-way between the vertical stabilizer air pad 96 and the air cushion stabilizer 104. By regulating the amount of air which is ejected from each side of air pad 94, leaning or swaying of the passenger compartment 80 may be substantially counteracted and controlled to within an acceptable amount. Advantageously, the degree of sway or leaning of the passenger compartment 80 would be sensed by a computer input sensor located in the passenger compartment 80 and the sway counteracted by means of a servomechanism operative upon the running gear. Alternately, the pressure applied to the drive wheels 90 may be varied in response to a sway sensor so that strut 84 may be maintained in its vertical position through articulation of pivot 103. Another means to maintain the desired stability and orientation would be to use a more conventional arrangement of hydraulic servo-cylinders to control the angle across pivot 103 in response to the sway sensor.

Referring particularly to FIG. 2, a cross section of one embodiment of the strut 15 is shown. The particular configuration is chosen with the radius of the arcs at 48 being substantially equal to the outer radius of the slot at 42a. The interior curve 46 of the strut is chosen to be substantially equal to the radius of curvature of the slot at 42b indicated by the curvature radius R. This configuration provides the maximum amount of material for use in the strut 15 commensurate with the requisite ability to traverse a curved section of the slot.

In FIGS. 3 and 4 details of one embodiment of the switching mechanism used in this invention are shown. Stabilizer wheels 136 and 138 are provided in this embodiment to serve the function of lateral stabilization and switching of the car from one track to another. The lateral stabilizer air pad and switching apparatus shown in FIGS. 6 and 7 could serve here equally well. In the embodiment shown in FIG. 3, the stabilizer wheel 136 is forced outwardly against either upper right switching track 130 or lower right switching track 132. The stabilizer wheel 138 is forced outwardly against either upper left switching track 131 or lower left switching track 133. The stabilizer wheels are constructed and located so as to keep strut 84 located substantially in the middle of slot 42 at all times. Slot 42 splits into two tracks, 42R and 42L, which define the path of the strut 84 whenever the transit car traverses the slot chosen. The right upper switching track 130 and left upper switching track 131 define the path of the stabilizer wheels 136 and 138 respectively whenever the transit car takes the left hand path defined by slot 42L. Guide 134 is positioned so that wheel 138 may engage it at the time stabilizer wheel 136 passes slot 42R which eliminates a portion of the right upper switching track 130. To traverse the straight path defined by slot 42R, the stabilizer wheels 136 and 138 are lowered into the position at which they engage right lower switching track 132 and left lower switching track 133 respectively. When traveling upon this path, the transit car will proceed straight ahead along the path defined by slot 42R. Switching cylinders 140 and 142 are utilized to raise and lower the stabilizer wheels 136 and 138 respectively.

Figure 8:
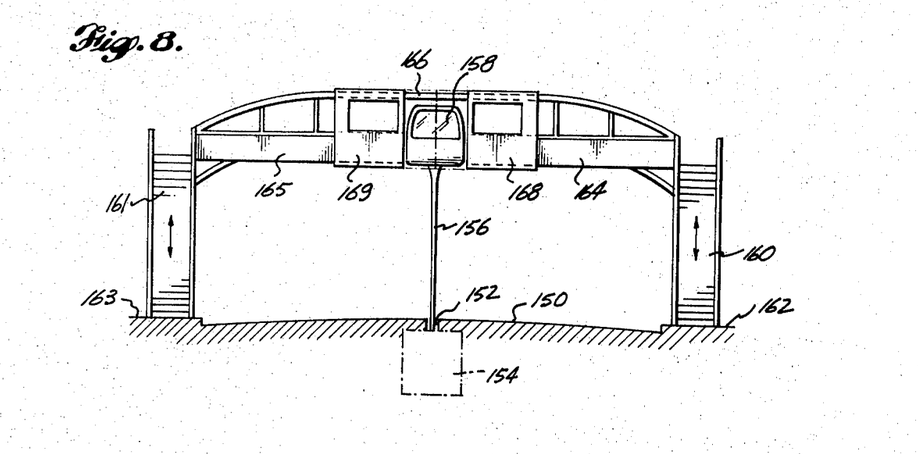
FIG. 8 shows one type of single position station for loading and unloading passengers.
Figure 9:
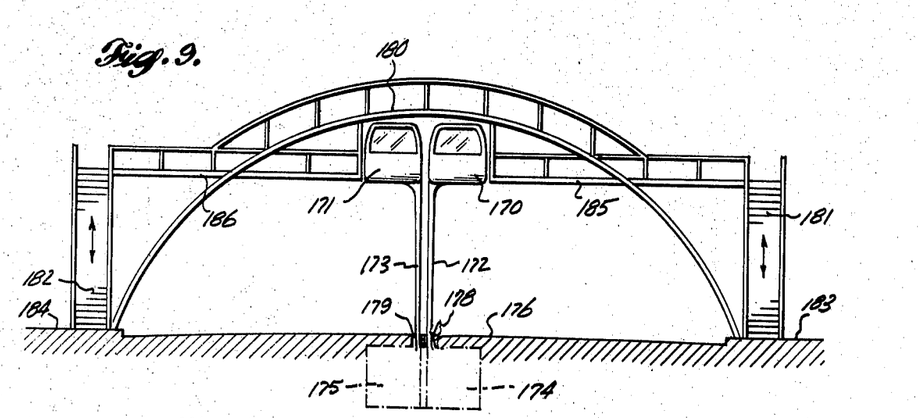
FIG. 9 shows one embodiment of a two position station for loading and unloading passengers.
Figure 10:
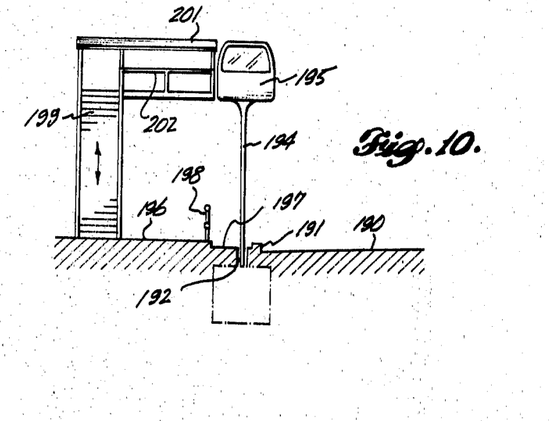
FIG. 10 shows a single position sidewalk access station particularly adapted for use in urban areas.

Referring now to FIGS. 8 through 10 three different embodiments of the many types of passenger loading and unloading stations suitable for use with the transit system described in this invention are shown. Of course, in urban areas, entrance into and exit from the transit vehicles will usually be accomplished at the mezzanine level or second floor of existing buildings. However, in areas which do not have suitable buildings, structures as shown in FIGS. 8 through 10 may be constructed and utilized. In FIG. 8, a passenger loading station is shown for use over a normal street in an urban area with the transit system operating in the center thereof between the lanes of traffic. The road surfaces 150 has a slot 152 cut therein which communicates with a tunnel 154 containing the running gear and associated apparatus for driving the transit car. A curb (not shown) may be provided at each side of the slot 152 if desired to aid in maintaining traffic flow away from the slot. Strut 156 carries the passenger compartment 158 well above the level of the street so as to not interfere with the normal surface traffic functions of the roadway below. Stairways 160 and 161 are provided at each side of the station and may be positioned at one side or the other of the sidewalks 162 and 163 respectively. The passenger loading platform 164 and 165 is provided at the proper level for entering the passenger compartment 158 and is supported overhead by arch 166. Movable sections 168 and 169 are moved inwardly whenever a transit car is not present so that the station serves as a pedestrian overpass, or in the event of two-way operation as depicted in FIG. 9, so that passengers may move from one side to the other for the purpose of boarding the proper transit car or to exit on the desired side of the street. The movable sections 168 and 169 are retracted whenever a transit vehicle approaches so that it may enter unimpeded into the loading position shown in FIG. 8.

A second embodiment of the transit system of this invention for use at the center of an existing roadway is shown in FIG. 9. In this embodiment, a pair of offset-type transit vehicles are shown having passenger compartment 170 and 171, struts 172 and 173 respectively and running gear tunnels 174 and 175 respectively positioned beneath the roadway 176 at the approximate center thereof. Struts 172 and 173 pass downwardly through the roadway through slots 178 and 179 respectively. In this embodiment the strut attaches to the side of the passenger compartment rather than at the middle so that a pair of transit vehicles may pass side by side without having the slots through the roadway spaced far apart. Thus, a minimum amount of the existing roadbed will be disrupted through the use of the transit system. The station shown in FIG. 9 has an overhead walkway 180 provided so that passengers may pass from one side of the street to the other and also so that they may enter either of the cars as desired. Stairways 181 and 182 are positioned upon sidewalks 183 and 184 respectively and connect with the passenger loading platforms 185 and 186 respectively.

FIG. 10 shows a third embodiment of the passenger boarding station particularly for use in urban areas in which there is a sidewalk present with a parking strip between the sidewalk and the curbing. In FIG. 10 a street surface 190 is shown with a curb 191 at the edge thereof. Immediately adjacent the curb 191 is a slot 192 extending downwardly into tunnel 193 which houses the running gear for the transit car. Strut 194 extends upwardly to passenger compartment 195 positioned above the street level so as to not interfere with the normal usages associated with the street and sidewalk. Sidewalk 196 is positioned inwardly from the parking strip 197 and separated therefrom by a fence or railing 198. A stairway 199 is provided extending upwardly from the sidewalk 196 to the passenger loading platform 200. A roof 201 may be provided to protect the passengers from the elements while waiting for the transit car. Railing 202 and other safety features may be provided as needed.

The novel mass transit system of this invention thus provides a system compatible with existing right-of-way usages of streets and alleys and the like which may be combined with the utilities required to service a community. A safe, effective rapid mass transit system thus results which is aesthetically pleasing and eliminates the drawbacks previously encountered with rapid transit systems heretofore known. The relatively low costs involved to prepare and operate the system make it conducive for use in serving residential areas effectively yet permits the use of larger vehicles on trunk lines adding the necessary versatility completely lacking in prior art transit systems. Small to medium sized cars may be used in residential areas while larger cars or several cars connected together may be used in areas of high population density or urban areas in which a large number of people must be transported from one location to another. The present design of existing streets, roads, and freeways will permit the installation of this mass transit system as a part thereof without the need of condemning additional right-of-way by placing the entrenched compartment and slot in the median strip or underneath the roadway shoulders. The simple and effective switching means permits the rapid transit cars to enter and leave trunk lines to serve outlying communities or to bring passenger loads into the high density urban area. The air pollution problem associated with internal combustion powered transit systems is eliminated by the use of electricity to provide the power necessary to operate the transit vehicle.

Referring now to FIGS. 11 through 15, cargo carrying embodiments of the invention are illustrated. Broadly, these embodiments use a running gear and carriage assembly similar or identical to those employed in the passenger carrying embodiments. The carriage assembly runs in an entrenched, underground passageway or guideway positioned below ground level. The lower portion of strut is connected to the upper portion of the carriage and extends upwardly through an elongate slot, which runs essentially parallel to the underground passageway. Generally, the upper portion of the strut supports one or more load carrying compartments, such as conventional containers utilized for present day transportation of goods. A lift mechanism is incorporated into the top portion of the strut, which extends above ground level, to lower and raise the load carrying compartments from ground level to a height sufficient to clear vehicular traffic and other obstructions situated on the ground level. Normally, the upwardly extending height of the strut in the load carrying embodiments is somewhat higher than the height of the strut in the passenger carrying embodiments. However, the overall height of the load carrying strut is comparable to the combined overall height of the strut and passenger carrying compartment.

It is contemplated that the load carrying embodiments will be utilized not only for short and intermediate distance transportation of cargo but also can be utilized in warehouses and for other very short distance transportation needs where floor space at ground level is at a premium. In operation the carriage with its upwardly extending strut is moved along a passageway to a loading location such as a platform inside or exterior of a warehouse. A cargo carrying container, which can be of the type which is supported by wheels or is transported by forklift devices, is then positioned beside the upwardly extending strut. A lift mechanism on the strut is then attached to the container through an appropriate latching means, after which the lift mechanism raises the container from ground level to a height sufficient to clear existing vehicular traffic.

Preferably a container is positioned on each of the elongate sides of the upwardly extending strut to centralize the load on the strut. However, if desired, a single container can be positioned on only one side of the strut for specialized purposes. For transporting large containers, a single or double carriage assembly can be used to support two struts, which are spaced from each other along the slot. A single large container can then be positioned between the two struts and raised by an appropriate lift mechanism on the struts to a height sufficient to clear existing vehicular traffic.

Figures 11, 13:
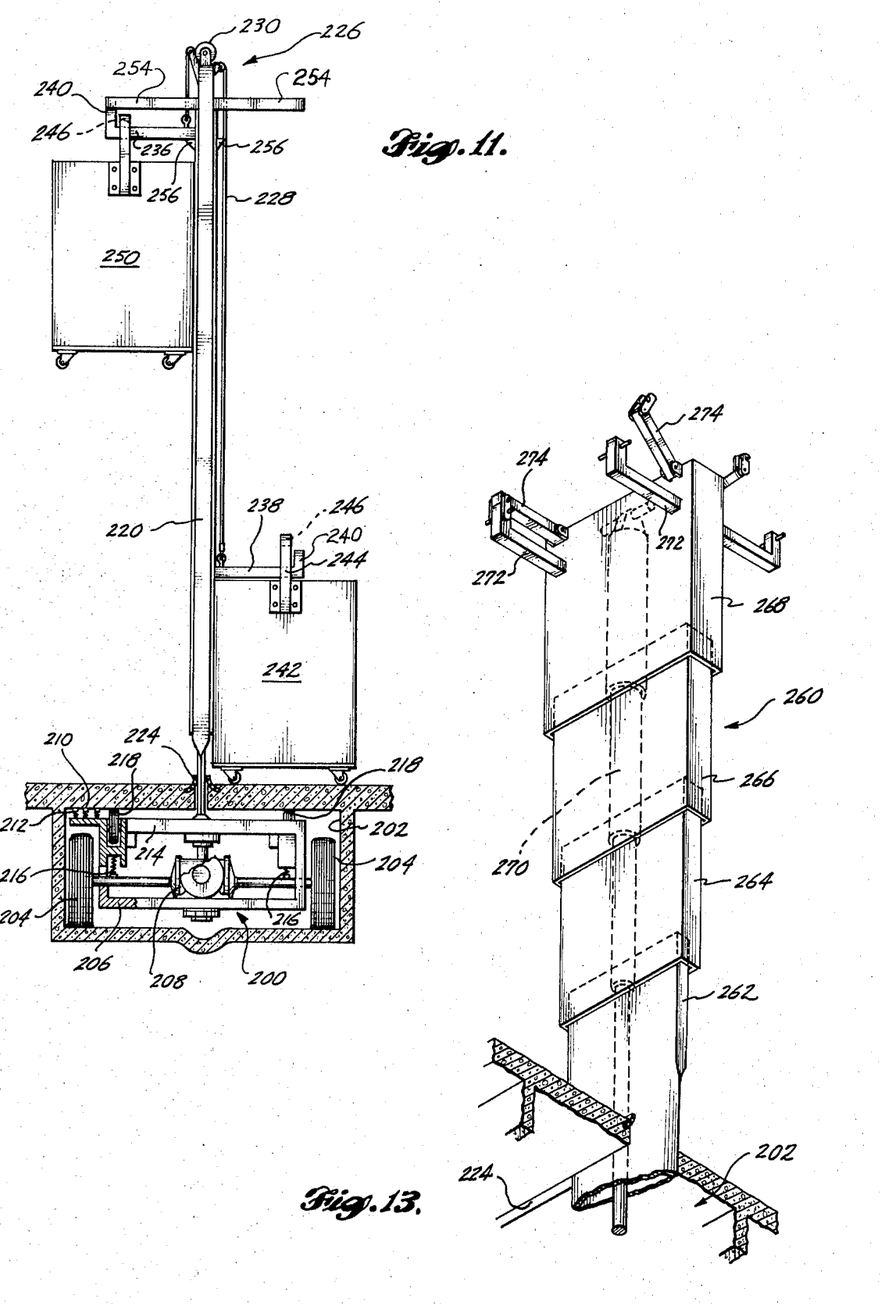
FIG. 11 is an end view of a cargo transportation vehicle in accord with the present invention showing a rubber tire supported running carriage to which a strut is connected, the strut having means thereon for lowering and raising containers to and from the ground.
FIG. 13 is an isometric view of an alternate strut construction embodying telescopic strut sections used for lowering and raising containers to and from the ground.
Figures 12, 14, 15:
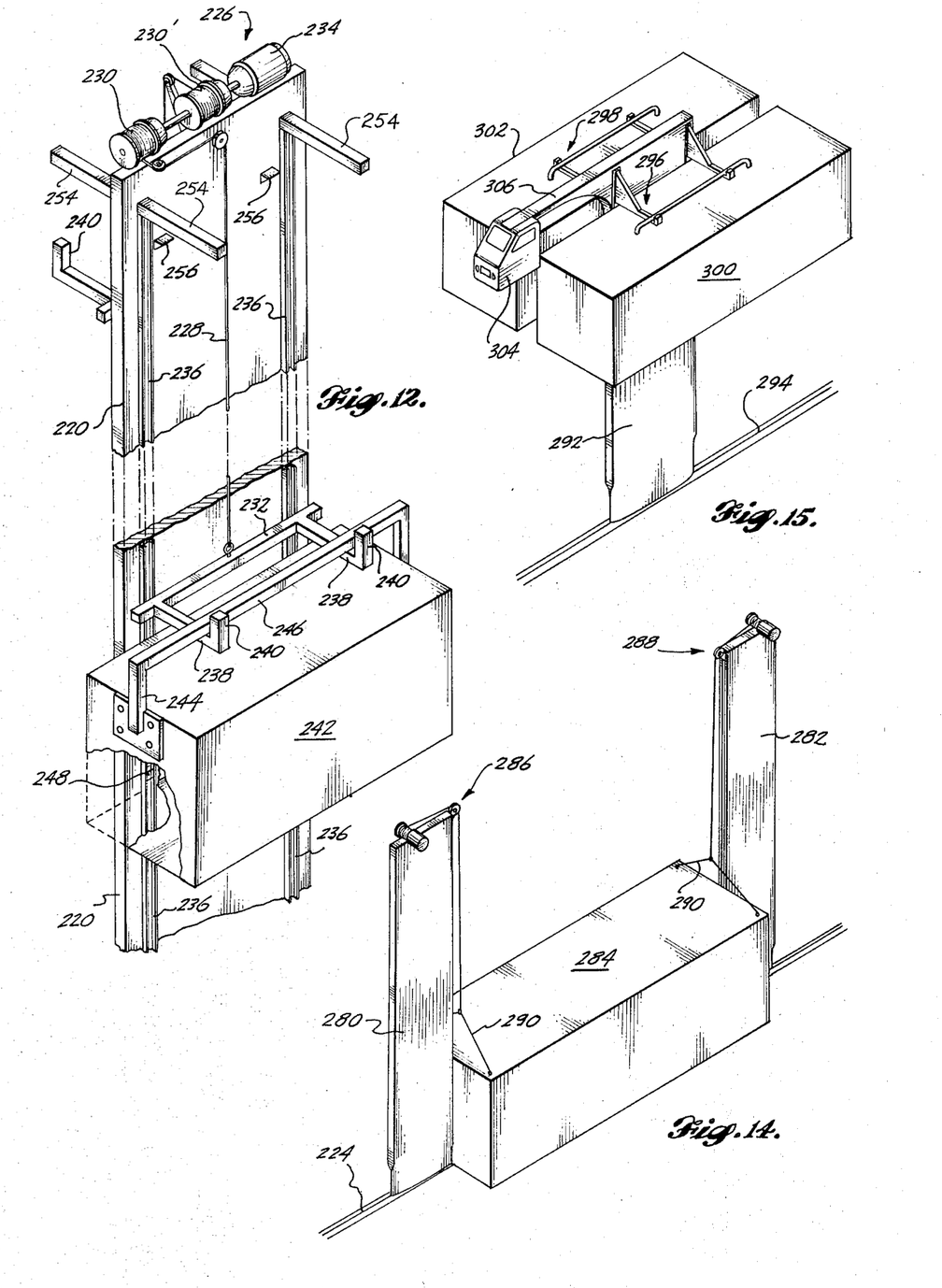
FIG. 12 is an isometric view of the strut shown in FIG. 11 illustrating the container lowering and raising mechanism in greater detail.
FIG. 14 is a simplified isometric view of two struts interconnected by a running carriage (not shown) illustrating the manner in which a large container can be transported in accord with the invention.
FIG. 15 is a simplified isometric view of an operator's cab cantilevered from the top of a container support strut, which cab is positioned forwardly of the containers in their raised position.

Referring specifically to FIGS. 11 and 12, a carriage generally designated 200 is positioned in an underground passageway 202. The vertical load on the carriage is supported by rubber tired wheels 204 in turn connected through axles to the lower portion 206 of the carriage chassis. An electric motor 208 is mounted on the central portion of the chassis 206 and is drivingly connected through appropriate transmission mechanism to the axles 209 which rotate the rubber tired wheels 204. A bus bar 210 is located in the passageway and is contacted by sliding contacts 212 mounted on the upper portion 214 on the chassis. The sliding contacts 212 are electrically interconnected with the motor 208 in a conventional manner. The upper portion 214 chassis is affixed to the lower portion 206 of the chassis by side frame members 215. The springs 216 are preloaded to cause the axles to bear against the lower portion 206 of the chassis. If the wheels hit an obstruction in the passageway the loaded springs provide a means through which the axles can yield to prevent breakage. The upper chassis portion 214 carries a set of laterally spaced rubber tired wheels 218 which contact the top wall of the passageway 202. This contact provides a lateral stabilizing force to the carriage 200 and counteracts overturning moments transmitted to the carriage through the strut 220.

The strut 220 is connected to the upper portion 214 of the chassis through a subframe 222. The upper portion of the strut 220 has a slightly larger cross-section than the lower portion of the strut which extends downwardly through the slot 224 communicating between ground level and the passageway 202. The upper portion of the strut 220 carries a lift mechanism, generally designated 226, which in this embodiment includes a pair of winch drums driven by an electric motor. Container lift mechanisms are located on each side strut. The two mechanisms are similar to each other and will be described primarily in relation to the mechanism on the right side of the strut as viewed. A cable 228 is wrapped on one of two winch drums 230 and 230' and has its free end connected respectively to an elongate bar 232 situated in a horizontal position alongside the strut. The cable 228 is strung through a pair of idler sheaves to centralize its connection to bar 232. The drums 230 are driven through a clutch and brake mechanism of conventional design (not shown) by a central drive shaft in turn operatively connected to the output shaft of a reversible electric motor 234. A pair of tracks 236 are mounted on opposing sides of the strut 220. These tracks carry followers (not shown) which are affixed at spaced locations to the elongate bar 232. These followers counteract the turning moment placed on the bar 232 when loaded to prevent it from rotation about its longitudinal axis. The elongate bar 232 also carries transverse arms 238. The winch drums 230 pays out and takes up cable 228 to lower and raise the arms 238 relative to the strut.

As shown, a first container 242 has a pair of upstanding brackets 244 firmly affixed to the ends of the container. An elongate handle bar 246 extends between and is connected to the top portions of the upstanding members 244. The elongate bar 246 is spaced above the top of the container 242. As container 242 rests on the ground (FIG. 11), arms 238 are lowered so that the container can be moved toward the side of the strut 220 and so that the elongate bar 246 will be positioned over the arms 238. Thereafter the arms 234 are raised by taking up cable 238 with the winch drums 230, raising the container 242 upwardly to a position adjacent the top of the strut 220. A pair of followers 248 (only one of which is shown in FiG. 12) are fixed to the inside wall of the container and ride in the tracks 236 to prevent the container from rotating about its lateral axis when being raised.

As shown in FIG. 11, a second embodiment 250 on the left side of the strut is positioned at the uppermost position ready for transit. The outward end of the transverse arms 238 contain upright members 240 to prevent the elongate handle bar 246 from sliding off the transverse members 238. The upper ends of these upright members 240 engage the bottom edge of second members 254, affixed to and extending transversely outwardly from the upper end of the strut 220 adjacent the upper extent of the rails 236. In this manner the container is locked onto the arms 238 when in the uppermost position and is thus prevented from falling from the strut as the running carriage moves down the elongate passageway.

A safety latch mechanism, schematically represented by latch members 256, engages the bottom side of the bar 232 when it is in the upper position. The latch members 256 are schematically illustrated as spring loaded stops, which are pushed inwardly as the bar 232 passes by them. When it is desired to lower the containers, the latch members 256 are drawn inwardly by an actuating mechanism (not shown) to release the bars 232 in preparation for lowering by the winch mechanism.

An embodiment of a container lifting mechanism integrally combined with a strut is shown in FIG. 13. In FIG. 13 the strut, generally designated 260, comprises several telescoping sections 262, 264, 266, and 268. The lowermost and smallest of these sections 262 extends downwardly through the slot 224 in the passageway 202. The bottom section 262 is firmly affixed to a running carriage (not shown in FIG. 13). A telescoping hydraulic cylinder is positioned within the interior of the telescoping sections of the strut 260 to extend and retract the sections. The strut 260 is shown in its uppermost position with the hydraulic cylinder 270 extended and the telescoping sections 262 through 268 shown in their respective positions of extreme extension. Arms 272 extend outwardly from the elongate sides of the uppermost section 268 of the strut 260. These arms 272 can engage a container handle bar similar to that on the containers shown in FIGS. 11 and 12. A swinging latch 274, pivotally mounted on the uppermost section 268 above arms 272, can be brought down to releasably engage the arms 272 to prevent a container from falling off the arms 272 as it is being transported.

Referring to FIG. 13, another embodiment of the cargo handling system is shown. In this embodiment a carriage positioned in an underground passageway (not shown) supports two struts 280 and 282. These struts are spaced from each other along the elongate slot 224 at ground level and extend upwardly in parallel relationship from the slot. In this embodiment a large container 284, for example, a conventional container utilized in ship transportation on the order of 8 by 40 feet, is positioned between the two struts 280 and 282. Lift mechanisms, schematically shown as winches and designated 286 and 288, are mounted on the top portions of the struts 280 and 282, respectively. Cable connection 290 interconnects the winch cables with the container 284 near its upper, end corners. Upon loading the container is moved by conventional shorthaul transportation apparatus to a position between the stationary struts 280 and 282 and is interconnected with the lift mechanism as shown. During transit the container 284 is lifted by the lift mechanisms 286 and 288 to a position adjacent the upper ends of the struts 280 and 282. Upon loading the container is lowered by the lift mechanisms and is detached from the container. The container is then removed sideways out of position between the two struts. Thus, a new container can be positioned between the struts or the carriage supporting the two struts can be moved to a new docking location.

A further embodiment of the invention is disclosed in FIG. 15. In this embodiment a single large strut 292 extends upwardly of slot 294. The large strut carries a pair of lift mechanisms on its sides which are generally designated 296 and 298. Each of the lift mechanisms supportively engages respective containers 300 and 302. An operator's cab 304 is cantilevered from the top portion of the strut 294 on a beam 306. Preferably the operator's cab 304 is positioned forwardly of the containers so that good visibility is provided during transit.

The last embodiment of the system employs an operator's cab from which manual control of the carriage and related portions of the vehicle can be conducted. For certain applications, it may be desirable to completely automate the routing and control of the vehicle. In an automated system computer controlled routing information would be sent from a central location to a receiver and associated actuating mechanism on the carriage.

Although the present invention has been described in relation to a cargo carrying system, it is within the original concept that passenger carrying compartments can be substituted for the cargo carrying compartments during peak commuting hours or when the cargo handling load is at a minimum. The invention has also been described in relation to several embodiments. One of ordinary skill in the art will be able to effect various changes, alterations and substitutions or equivalents without departing from the concept as disclosed. It is therefore intended that the invention be limited only by the definition contained in the appended claims.

What is claimed is:

1. A transportation system comprising:
   an elongate passageway means, at least a portion of which underlies and is substantially parallel to a roadway, said passageway means defining running surfaces, said running surfaces having reaction surface means therein for providing vertical and overturning moment reaction components, said passageway means communicating with ground level through a single elongate slot;
   running gear means positioned for movement within said passageway means upon said running surfaces;
   strut means having a bottom portion connected to and supported by said running gear means and having a top portion extending upwardly through said slot, said strut means including lift means thereon for supportively engaging a load carrying compartment means, said lift means for raising and lowering said compartment means relative to said strut means between ground level and the top portion of said strut means, the top portion of said strut means having an upwardly extending height sufficient to position said compartment means a distance above ground level whereby pedestrian and vehicular traffic traversing said roadway at ground level and parallel to said passageway means can pass underneath said compartment.

2. The transportation system of claim 1 wherein said lift means comprises a flexible cable, engagement means connected to one end of said cable for interconnecting with mating engagement means on said compartment means, and means positioned on the top portion of said strut means for taking up and paying out said cable to raise and lower said compartment means relative to said strut means.

3. The transportation system of claim 1 wherein said lift means comprises support means for engaging a first compartment means on a first side of said top portion of said strut means and a second compartment means on a second side of said top portion of said strut means, and means for lowering and raising said first and second compartment means relative to said strut means.

4. The transportation system of claim 1 wherein the top portion of said strut means comprises a plurality of telescoping sections, means on at least one of said sections for supportively engaging a compartment means, and means for upwardly extending said telescoping sections so that the height of said upper portion is sufficient to position said compartment means said distance above ground level.

5. The transportation system of claim 4 wherein said top portion has first means on a first side thereof for supportively engaging a first compartment means and a second means on a second side thereof for supportively engaging a second compartment means.

6. The transportation system of claim 1 further comprising a cabin means for holding an operator for said running gear means, said cabin means being affixed to the top portion of said strut means.

7. The transportation system of claim 6 wherein said cabin is cantilevered from said top portion of said strut means and is positioned forwardly of said compartment means.

8. The transportation system of claim 1 wherein said strut means comprises at least two upwardly extending strut members, said strut members being spaced from each other along said elongate slot, said compartment means being supportively engaged by said lift means on said strut members and being positioned between said strut members.

* * * * *